Figure 1:
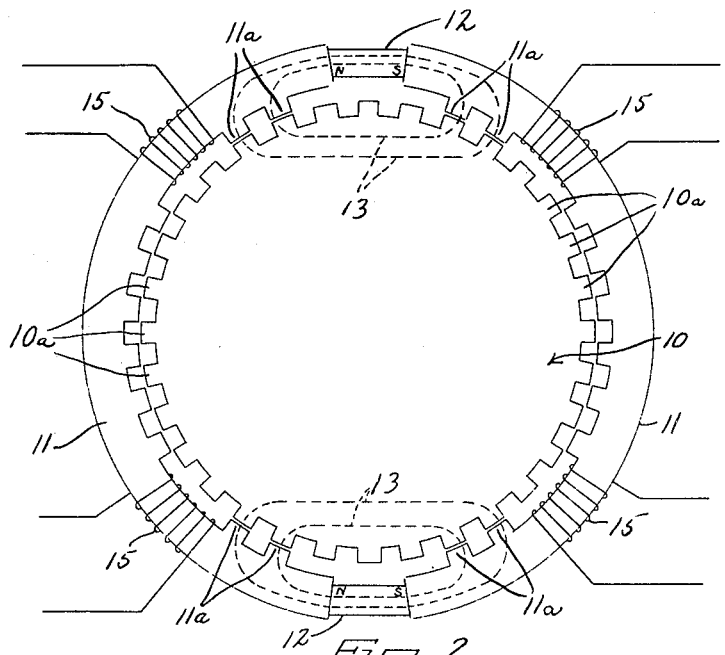

April 25, 1950     C. A. MAYNARD     2,505,130
INDUCTOR GENERATOR
Filed Jan. 10, 1948

Inventor
CHARLES A. MAYNARD

Patented Apr. 25, 1950

2,505,130

UNITED STATES PATENT OFFICE 2,505,130

INDUCTOR GENERATOR

Charles A. Maynard, Valparaiso, Ind., assignor to The Indiana Steel Products Company, Valparaiso, Ind., a corporation of Indiana Application January 10, 1948, Serial No. 1,647

2 Claims. (Cl. 171—252)

This invention relates to an inductor generator, and particularly to a mechanical generator capable of producing a relatively high frequency electrical output without requiring an excessive speed or size of the movable member of such generator.

The problem of generating a relatively high frequency voltage by a mechanical generator is one of the oldest in the electrical art. With a rotating machine, the problem has always been to generate a sufficiently high frequency of output without requiring an unnecessarily high rate of rotation, or excessive number of poles on the rotor structure, which would necessarily result in a large diameter machine, hence inherently limiting the speed at which the rotor could be revolved. The type of generator most commonly utilized in such applications heretofore is the well known Alexanderson inductor generator. However, these generators are of substantial size and involve relatively large rotor structure if frequencies greater than 10,000 cycles per second are to be obtained.

It is therefore not surprising that all applications wherein relatively small magnitudes of high frequency power are desired have heretofore resorted to generators or oscillators of the non-mechanical type. Recently, however, a development in the field of magnetic recording indicated again the extreme desirability of having a small, light-weight mechanical generator capable of producing a low power output having a frequency of 10,000 cycles per second and greater. As is described and claimed in the copending application of George E. Ziegler, Serial No. 678,228, filed June 21, 1946, and assigned to the assignee of this application and now abandoned, a magnetic recording unit may be substantially simplified if the motor required for driving the movable recording medium could also be employed to drive a mechanical generator to supply the high frequency bias generally utilized in such recording processes. Obviously, a generator constructed along the lines of the Alexanderson inductor generators would be completely impractical for such applications, due to the excessive size of such generators and the very substantial cost of producing such.

Accordingly, it is an object of this invention to provide an improved mechanical generator capable of generating relatively high frequencies without requiring an excessive speed of its movable elements.

A further object of this invention is to provide an improved high frequency generator of the inductor type which is sufficiently small in size to permit it to be employed in magnetic recording and similar units.

Another object of this invention is to provide an improved high frequency inductor type generator wherein the field excitation for the generator is provided by one or more permanent magnets and hence permits the generator to operate without requiring any supplementary source of electrical power.

A particular object of this invention is to provide an improved inductor type generator construction characterized by an arrangement of cooperating polar projections on the stator and rotor elements of the generator in such manner that a permanent flux flowing in the magnetic circuit of the generator is spatially shifted between a pair of distinct flux paths by virtue of the relative rotation of the rotor and stator elements, and such shifting of the flux path is employed to vary the flux linking an output coil of the generator, thus generating a voltage in such coil whose frequency is proportional to the cycle rate of such flux variations.

The specific nature of the invention, as well as other objects and advantages thereof, will become apparent to those skilled in the art from the following detailed description taken in conjunction with the annexed sheets of drawings, which, by way of preferred example only, illustrate one specific embodiment of the invention.

Figure 2:
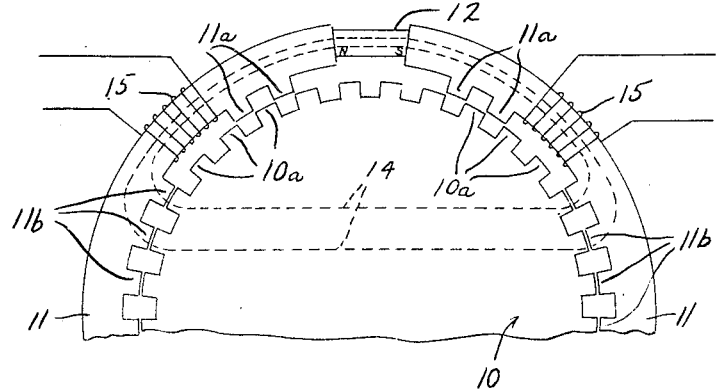

On the drawings:

Figure 1 is a schematic view of the assembled rotor and stator elements of an inductor generator embodying this invention, illustrating the flux paths produced in the generator at one angular position of the rotor with respect to the stator; and Figure 2 is a partial view similar to Figure 1, but showing the flux paths established in the generator for a different relative angular position of the rotor with respect to the stator.

As shown on the drawings:

While this invention has been illustrated only by a schematic representation of the rotor and stator elements of the generator, it will be understood by those skilled in the art that such elements partake of conventional construction in all details other than those specifically pointed out in the following description. Furthermore, it is to be understood that the terms "stator" and "rotor" are merely relative and that the fundamental relation between such elements is the occurrence of relative movement therebetween, irrespective of which element is actually moving in space.

Thus, I provide a rotor element 10 of generally disk-like configuration which may be conveniently produced by axial stacking of identical laminations of magnetic material having low hysteresis loss. The rotor periphery is of generally tooth-like configuration, thus providing a plurality of circumferentially spaced polar projections 10a which, in the illustrated embodiment, are uniformly spaced around the periphery of the rotor 10.

The stator element is of annular configuration. According to this invention, the stator is formed by assemblage of a plurality of arcuate segmental magnetic structures 11 with permanent magnet elements 12, the magnets 12 being respectively disposed between each of the successive segmental structures. The magnetic segments 11 may be produced by axial stacking of individual laminations of material of low hysteresis loss. The permanent magnets 12 are disposed in general alignment with the arcuate contour of the segmental sections and arranged with the poles thereof circumferentially spaced and thus tending to produce a flow of magnetic flux around the circumference of the stator structure 11. When a plurality of such magnetic elements 12 are provided, for example, when two such permanent magnets are provided as shown in the illustrated embodiment, the polarity of the magnets is reversed in a circumferential direction so that the permanent magnets tend to oppose each other so far as producing a flux flow around the circumference of the annular stator. Such arrangement permits flux flow through the rotor 10.

On each side of the permanent magnet elements, the stator magnetic structure is provided with one or more inwardly directed pole face projections 11a which are concurrently radially alignable with a corresponding number of pole face projections 10a of the rotor structure in any one of a plurality of distinct angular positions of said rotor with respect to the stator, one of such positions being illustrated in Figure 1. A second set of inwardly projecting pole projections 11b are also formed on the stator magnetic structure respectively disposed on opposite sides of each permanent magnet 12 and being spaced a greater distance from the ends of the permanent magnet 12 than the first set of projections 11a. This set of projections are likewise suitably spaced and arranged so as to be alignable with an equivalent number of the rotor pole projections 10a, such alignment also occurring in any one of a plurality of distinct angular positions of the rotor 10 with respect to the stator 11, but such positions being angularly spaced from the positions of alignment of the first set of stator projections 11a with the rotor pole projections 10a, one of such positions being illustrated in Figure 2.

By such an arrangement, in one angular position of the rotor 10 with respect to the stator 11, the primary stator pole projections 11a will be radially alignable with the rotor pole projections 10a to define a minimum air gap region therebetween. However, at this position, the secondary stator projections 11b will be misaligned with the rotor projections 10a so as to create a maximum air gap region between the secondary stator projections and the rotor. This condition is specifically illustrated by the position of the rotor 10 with respect to the stator 11 shown in Figure 1. Hence a flux path 13 for the flux produced by the permanent magnet 12 is set up through the rotor structure and the primary stator pole projections 11a, which is of substantially less reluctance than any other path available through the combined stator and rotor magnetic structures. Specifically, the flux path 13 is of much less reluctance than any flux path traversing the secondary stator projections 11b.

In a second angular position of the rotor 10 with respect to the stator 11 which is displaced from the first position described above by the angular extent of a single pole projection 10a, the rotor 10 will assume the relationship with respect to the stator 11 illustrated in Figure 2. In this position, a group of rotor pole projections 10a are aligned with the secondary stator pole projections 11b while the primary stator pole projections 11a are misaligned with the rotor pole projections 10a. Hence the minimum reluctance flux path for the flux produced by the permanent magnet 12 is now a path 14 which traverses the secondary stator projections 11b but not the primary stator projections 11a.

From the foregoing description, it is readily apparent that each revolution of the rotor 10 with respect to the stator 11 produces a plurality of shiftings of the paths of flux produced by the permanent magnet elements 12 from one to another distinct portion of both the stator and rotor magnetic structure. Furthermore, such shifting occurs as many times in one revolution as there are pole projections or teeth on the rotor.

Therefore, in order for the described construction to function as a generator, it is only necessary to locate a pickup coil in such position on either the stator or rotor structure so that in one angular position of the rotor with respect to the stator, the coil is threaded by the flux flowing in either the paths 13 or 14, while in the second angular position of the rotor with respect to the stator, the coil is not threaded by such flux due to the shift in the path of the flux from the path 13 to 14 or vice versa. For example, a pickup coil 15 may be located on the stator magnetic structure 11 at a point intermediate the primary stator pole projections 11a and the secondary stator pole projections 11b in the manner shown in the drawings. Thus, a total of four coils may be provided for the double permanent magnet structure illustrated in the drawings, and such coils may, of course, be connected in series or parallel to supply any desired load requiring an alternating voltage.

The fact that relatively high frequencies may be obtained by a generator constructed as heretofore described without requiring excessive rotational speed of the rotor or diametrical size of the rotor, may be readily demonstrated. Assume that an output voltage of 15,000 cycles per second is desired. Then, at a rotational speed of the rotor 10 of 3,000 R. P. M., which is obviously a very practical speed, it would be necessary to have 300 teeth or pole projections on the rotor 10. If a 4-inch diameter be assumed for the rotor 10, the distance from the center of one tooth or pole projection to the center of the next tooth would be approximately .040 inch. The width of each tooth or pole projection would then be about .020 inch. Obviously, such dimensions of the rotor and its pole projections are entirely practical and both the rotor and stator element may be fabricated in conventional fashion by a stamping operation. Also, much higher frequencies may be obtained either by increasing the speed of the rotor, the diameter of the rotor, or the number of teeth or pole projections on the rotor.

It will be understood by those skilled in the art that the illustrated embodiment employing two permanent magnets is merely an exemplary illustration of the principles of this invention. Obviously, a practical generator could be produced with a single permanent magnet, or with a plurality of permanent magnets greater than two in number, or with an excitation coil substituted for the permanent magnet.

It will, of course, be understood that various details of construction may be modified through a wide range without departing from the principles of this invention, and it is, therefore, not the purpose to limit the patent granted hereon otherwise than necessitated by the scope of the appended claims.

I claim as my invention:

1. In combination, an annular magnetic stator, a magnetic rotor mounted within said stator and relatively rotatable with respect thereto, a plurality of pairs of circumferentially spaced, inwardly directed pole projections on the inner peripheral face on said stator, a plurality of pairs of circumferentially spaced, outwardly directed pole projections on the peripheral face of said rotor, the spacing between said stator projections of a pair being unequal to the spacing between the rotor projections of a pair, whereby when one projection of a stator pair is radially aligned with one projection of a rotor pair, the other projection of the stator pair is substantially misaligned with respect to the other projection of the rotor pair, means for producing a magnetic flux traversing the air gap between said stator and said rotor, and a pickup coil mounted on said stator between said projections of one of said pairs and arranged to be linked by said flux traversing one of the projections but not linked by said flux traversing the other projections of said one pair.

2. In combination, a magnetic rotor having a toothed periphery, an annular magnetic stator surrounding said rotor, a permanent magnet disposed in arcuate segmental relationship in said stator with the poles thereof relatively circumferentially spaced, thereby tending to produce a circumferential flux path around said stator, a first pair of inwardly directed projections on said stator respectively disposed on opposite sides of said magnet and being concurrently radially alignable with a first set of spaced toothed portions of said rotor, thereby providing a first flux path through said rotor of less reluctance than said circumferential flux path, a second pair of inwardly directed projections on said stator respectively disposed on opposite sides of said magnet, but circumferentially more remote therefrom than said first pair, said second pair of stator projections being concurrently radially alignable with a second set of said spaced toothed portions of said rotor to provide a second flux path through said rotor of less reluctance than said circumferential path, said first and second flux paths being established respectively at different angular positions of said rotor relative to said stator, and a pair of coils respectively disposed on opposite sides of said magnet and linking the segmental portions of said stator located between said stator projections of said first and second pairs, whereby flux flow in said second path links said coils while flux flow through said first path avoids said coils.

CHARLES A. MAYNARD.

REFERENCES CITED

The following references are of record in the file of this patent:

UNITED STATES PATENTS

| Number | Name | Date |
| --- | --- | --- |
| 1,684,343 | Cardellino | Sept. 11, 1928 |
| 2,446,446 | Wargin et al. | Aug. 3, 1948 |